United States Patent [19]
Fiedler

[11] Patent Number: 5,985,042
[45] Date of Patent: Nov. 16, 1999

[54] COMPUTER MOUSE CLEANING DEVICE

[76] Inventor: John Fiedler, 2412 Wroxton, Houston, Tex. 77005

[21] Appl. No.: 08/864,713

[22] Filed: May 28, 1997

[51] Int. Cl.[6] .................................................. A47L 25/00
[52] U.S. Cl. .................... 134/6; 15/104.93; 15/104.001; 15/244.4
[58] Field of Search ........................ 15/104.001, 104.002, 15/104.061, 104.93, 210.1, 244.1, 244.4; 134/6

[56] References Cited

U.S. PATENT DOCUMENTS

| 1,991,559 | 2/1935 | Kingman | 15/104.93 |
| 3,651,530 | 3/1972 | Schultz | 15/104.061 |
| 4,383,346 | 5/1983 | Bochinksi et al. | 15/104.061 |
| 4,550,466 | 11/1985 | Schmitz | 15/104.061 |
| 4,569,097 | 2/1986 | Echols | 15/104.061 |
| 4,760,618 | 8/1988 | Chapin | 15/104.001 |
| 5,105,498 | 4/1992 | Dinkelacker | 15/104.061 |
| 5,418,999 | 5/1995 | Smith . | |
| 5,519,910 | 5/1996 | Messina | 15/104.002 |
| 5,615,438 | 4/1997 | Field | 15/104.002 |

FOREIGN PATENT DOCUMENTS

| 2268049 | 1/1994 | United Kingdom | 15/104.001 |

OTHER PUBLICATIONS

Commercial application, Clean Mouse, 2110 Second Avenue Muscatine, Iowa 52761.

*Primary Examiner*—Terrence R. Till
*Attorney, Agent, or Firm*—Locke Liddell & Sapp LLP

[57] ABSTRACT

The invention is a cleaning assembly for a computer mouse comprised mainly of a sphere. The sphere contains a plurality of non-fibrous projections extending radially from the surface. These projections are of a length sufficient to touch the walls of the cavity of a computer mouse when the assembly is placed into a computer mouse. The cleaning assembly fits snugly into the cavity of the mouse. The external surfaces of projections and sphere surface form an uneven cleaning surface and size of the cleaning assembly that cleans the computer mouse.

20 Claims, 4 Drawing Sheets

COMPUTER MOUSE CLEANING DEVICE

BACKGROUND OF THE INVENTION

A computer mouse is constructed of a housing having a removable bottom cover with a circular port. A mouse ball inside of the housing partially protrudes through the port and rolls along a working surface, such as a mouse pad, when operated by the user. The mouse ball is usually constructed of rubber coated metal. Rolling contacts inside the housing contact the mouse ball and send electrical signals to the computer representative of the movements of the mouse ball, and thus representative of the movements of the mouse.

Over time, the ball picks up foreign articles and grime which is transferred to the rolling contacts. This interferes with the functioning of the contacts to reliably track the movements of the mouse ball. The user is usually unaware that this is occurring, because the contacts are out of sight. The mouse becomes difficult to operate and most users either place the blame on the computer or the mouse. Knowledgeable users sometimes try to clean the contacts with pipe cleaners, which leave lint behind, or spray solvents, which are messy. A device for conveniently cleaning the computer mouse is much needed.

It is an object of this invention to provide a device which is well suited for cleaning the rolling contacts in a computer mouse. It is also an object of the invention to provide a device which itself is easily cleaned and easy to maintain. It is an object of the invention also to provide a device which makes cleaning the mouse a simple operation.

U.S. Pat. No. 5,418,999, Mouse Cleaner, by Smith, discloses a device for cleaning the mouse contacts. This device is simply an elongated, curved brush with bristles. It is shaped much like a dental instrument, since it is curved in order to reach in and clean the contacts of the mouse.

A commercial method of cleaning a mouse consists of the use of a ball and pad each composed of complementary "Velcro®" or similar hook and loop fastener material. The bristly "Velcro®" or similar hook and loop fastener side material is placed on the equivalent of the track ball used within the mouse. This "Velcro®" or similar hook and loop fastener ball is then placed into the mouse ball cavity without the cover being reattached. A cleaning solution is then applied.

The scrubbing board consists of the material portion of the Velcro. This mouse scrubbing board is usually a small circular pad. The mouse, with the bristly "Velcro®" or similar hook and loop fastener ball inside, is then moved over the scrubbing board several times in a circular motion. This motion serves to agitate the accumulated grime, and to pass the grime off on to the scrubbing board. However, to use this system, the ball and pad must be made of "Velcro®" or similar hook and loop fastener and must be used together.

SUMMARY OF THE INVENTION

The central element of the invention is a spherical cleaning ball. The cleaning ball is of such diameter that it fits directly into the mouse ball cavity of the mouse via the port. The cleaning ball has solid raised protrusions extending from the surface of the ball radially in all directions. The cleaning ball fits snugly within the cavity, but the cleaning ball still may rotate freely within the cavity. The protrusions touch the wall of the cavity and the exposed mouse rollers and contacts within the cavity.

After being placed in the mouse ball cavity of the mouse, the cover of the mouse is reattached. The mouse is then dragged across the surface as it would be in normal use. The protrusions on the cleaning ball then scrub those elements within the cavity which come into contact with the mouse during normal operation. After dragging the mouse in all directions, the cleaning ball is then replaced with the normal mouse ball.

The cleaning ball may then be washed in any conventional dishwasher or may be scrubbed by hand. This cleaning ball thus provides a means which easily cleans the rolling contacts in a computer mouse without the aid of any other specialized pads or brushes.

DETAILED DESCRIPTION OF THE PREFERRED EMBODIMENTS

Figure 1:
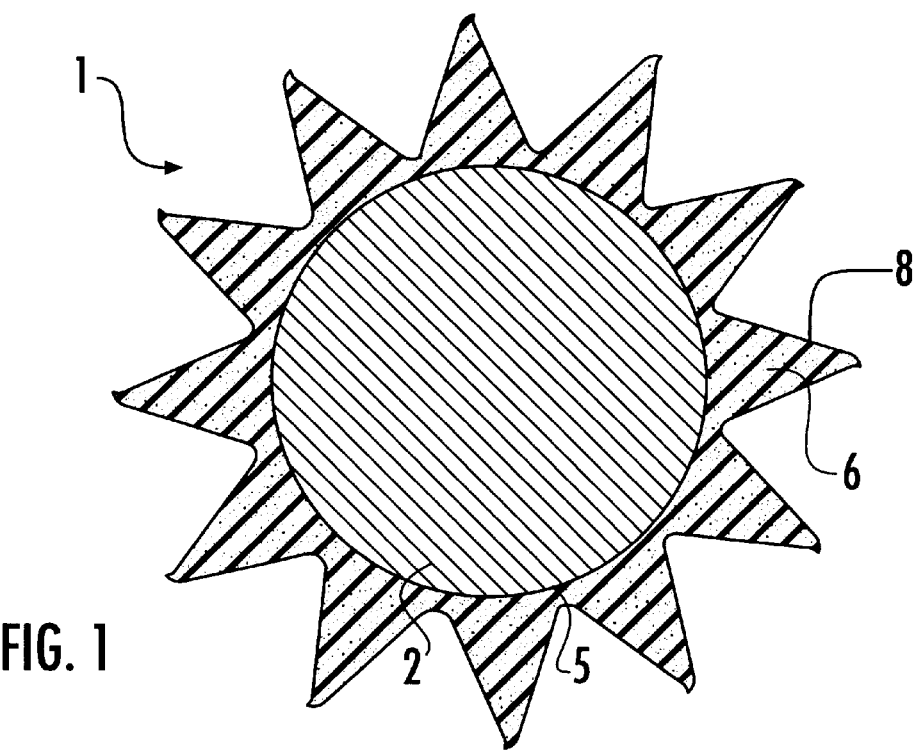
FIG. 1 shows a cross-section view of the cleaning device according to one embodiment of the invention.

The invention, cleaning device 1, consists at its core a sphere 2 with spherical surface 5. This sphere may be a solid uniform mass, as shown in FIG. 1, or it may contain one or more other inner cores, such as inner sphere 3 in FIG. 2 and FIG. 2a.

Figure 1A:
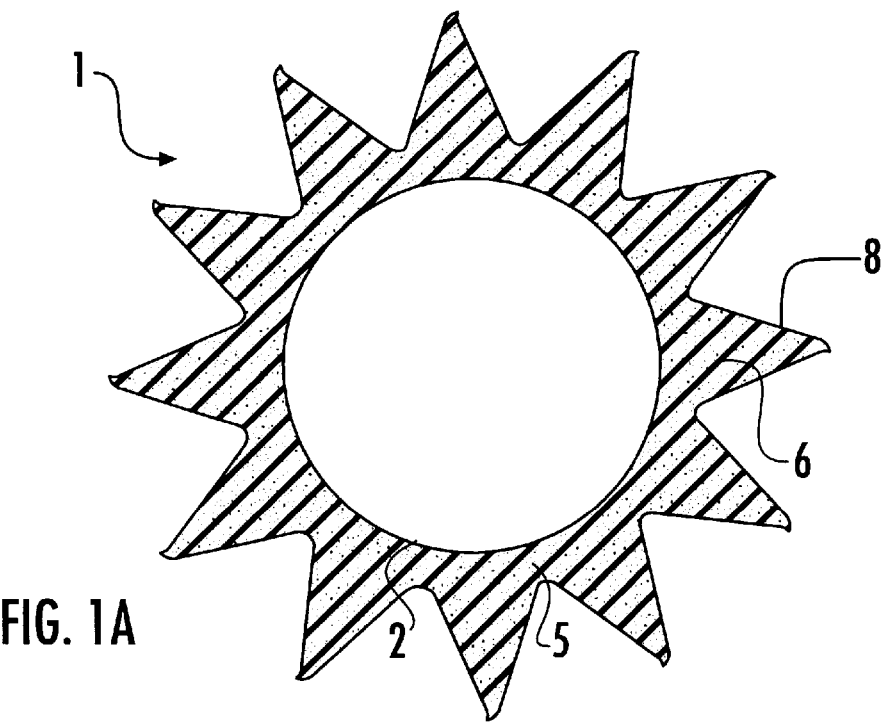
FIG. 1a shows a cross-section view of the cleaning device according to another embodiment of the invention.

This inner sphere 3 serves to add extra weight and create more traction against the opposing surfaces that the cleaning device rub against. The area between inner sphere 3 and spherical surface 5, or any other spaces within spherical surface 5, may also act as a well or reservoir for cleaning solvents as shown in FIG. 1a.

Figure 2:
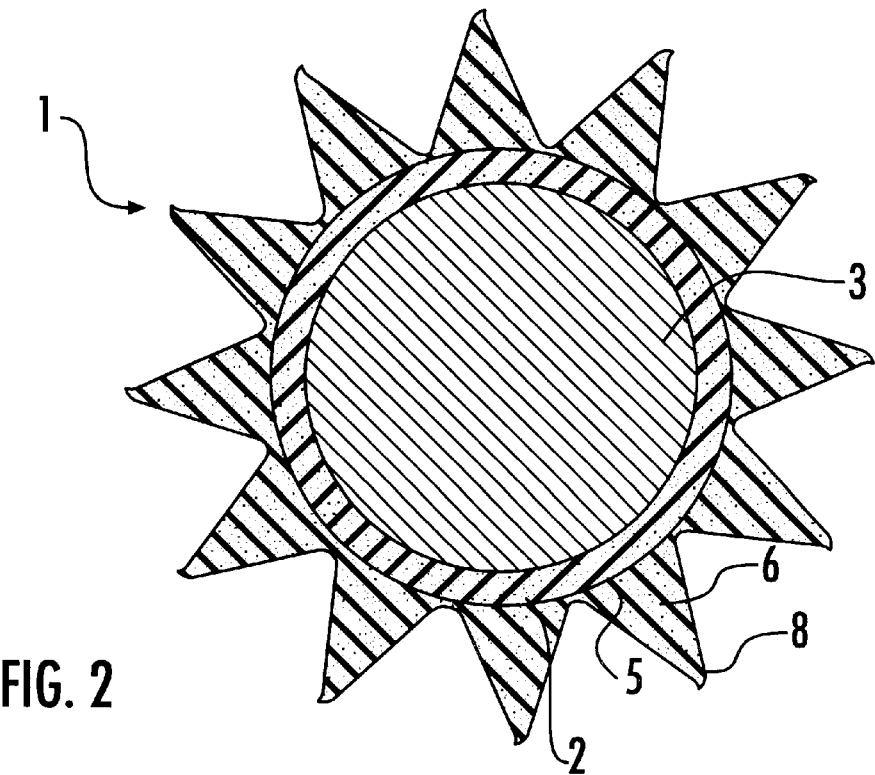
FIG 2 shows a cross-section view of the cleaning device according to another embodiment of the invention.
Figure 2A:
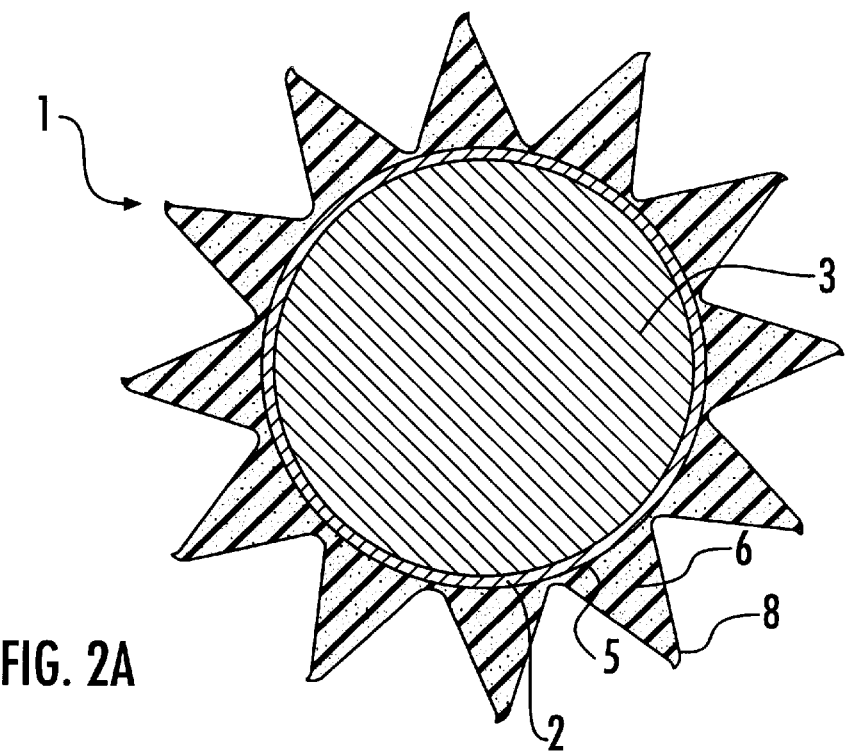
FIG. 2a shows a cross-section view of the cleaning device according to another embodiment of the invention.

In the preferred embodiment, inner sphere 3 is a stainless steel sphere approximately ½ inch in diameter. However, as noted above, sphere 2 may be uniform, or may contain other inner spheres, as shown in FIG. 2 and FIG. 2a. It should also be noted that these spheres may be made of any material which would enhance the operation of the cleaning device.

Sphere 2 has a spherical surface 5. Spherical surface 5 may be made of the same material of sphere 2, or may be composed of any different material. In the preferred embodiment, the inner sphere 3 is stainless steel and sphere 2 comprises rubber, for example. Spherical surface 5 may have a moisture repellent coating. In another embodiment, spherical surface 5 may be porous allowing cleaning solvents to pass from an inner reservoir to the surface 5. In yet another embodiment, the entire sphere 2 may be porous and act as a sponge-like reservoir for cleaning solvents as shown in FIG. 1a. In the preferred embodiment, spherical surface 5 is a rubber surface of the same type that a normal mouse ball surface known in the art is composed of.

Figure 3:
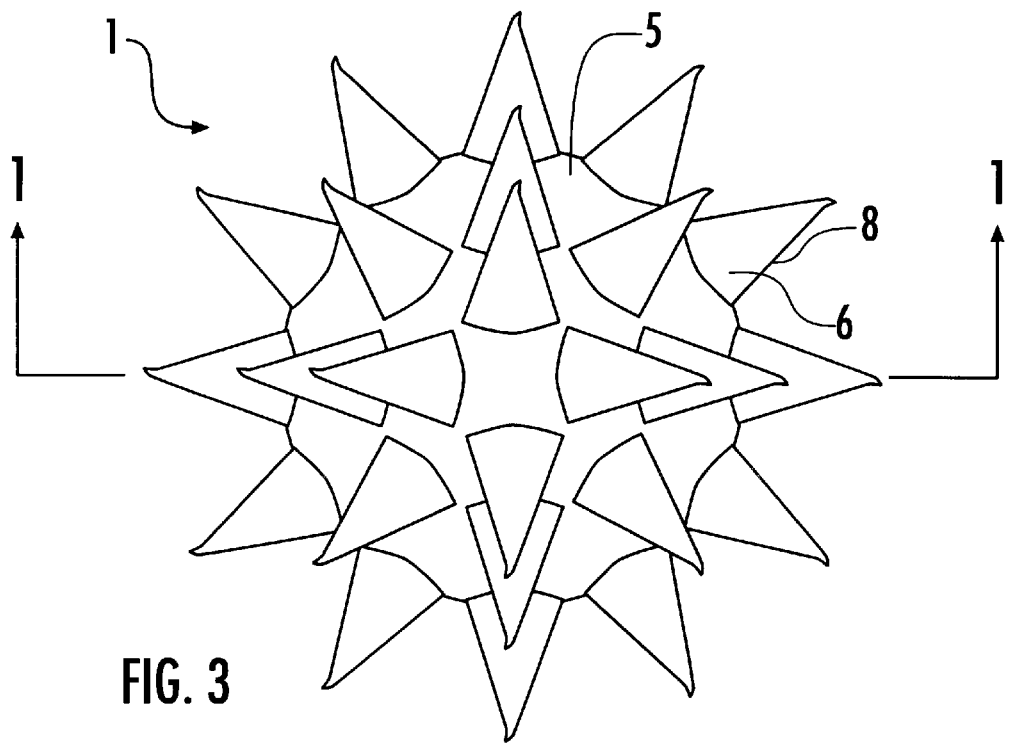
FIG. 3 shows a view of one embodiment of the invention as it would appear on the exterior.
Figure 3A:
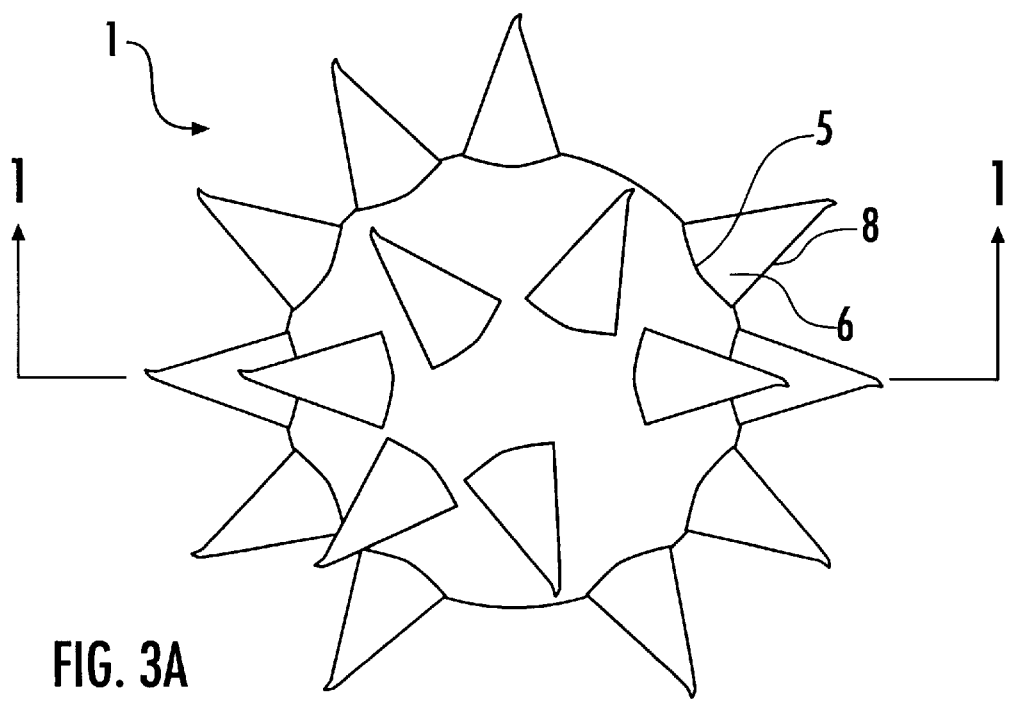
FIG. 3a shows a view of another embodiment of the invention as it would appear on the exterior.

Spherical surface 5 contains projections 6 projecting radially away from spherical surface 5, as shown in FIG. 3. These projections 6 are non-fibrous and can be evenly spaced, as shown in FIG. 3, or irregularly spaced, as shown in FIG. 3a, over the spherical surface 5. Projections 6 essentially form cleaning bristles on spherical surface 5. The radius of sphere 2 and the height of the bristly projections 6 should be such that cleaning device 1 fits snugly within the computer mouse ball cavity and the surface of sphere 2 and the surfaces of projections 6 be in contact with the rolling mouse contacts.

Figure 4:
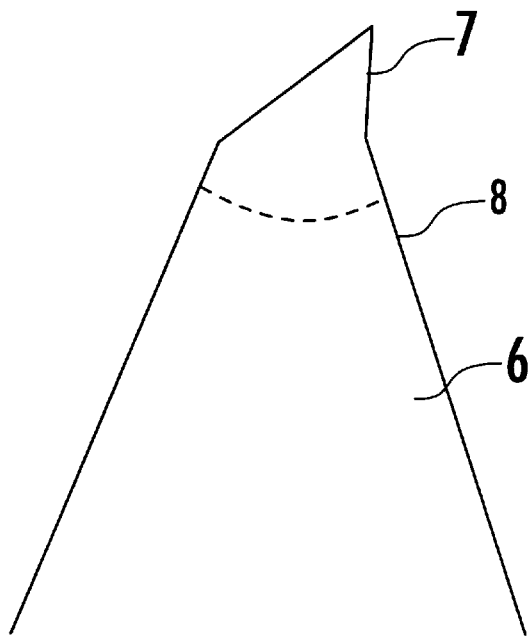
FIG. 4 shows a cross-section of one embodiment of a solid cleaning bristle appearing on the surface of the invention.
Figure 5:
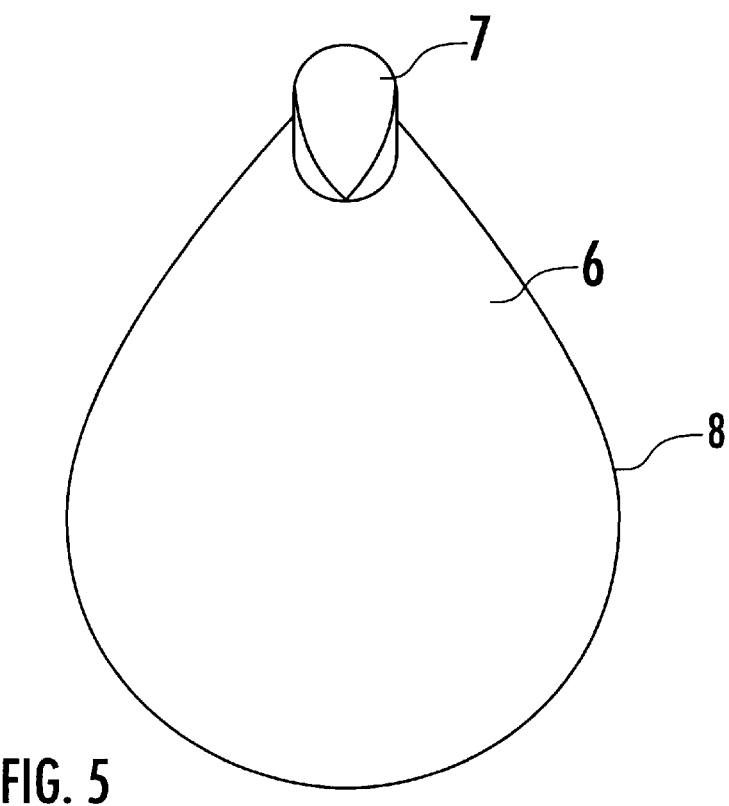
FIG. 5 shows a top side relief view of one embodiment of a solid cleaning bristle.

In the preferred embodiment, projections 6 are conical in shape. The conical projections extending radially from the spherical surface 5 are preferably conical with a bent edge 7 at the tip of the cone, as shown in FIGS. 4 and 5. However, it should be noted that projections 6 may take the shape of any solid non-fibrous mass, such as hemispheres, rectangular solids, pyramids, or any geometric shape. The projections 6 may also be amorphous raised surfaces on sphere 2.

Solid projections 6 have a projection surface 8. Projection surfaces 8 may be composed of the same material as sphere surface 5 or another material. Projection surfaces 8 may be composed of a moisture repellent surface, or a porous material that could be used as a reservoir for cleaning solvents. To further enhance the cleaning properties of the projection surface, the projection surface may be rippled, ridged, or made up of any other non-smooth surface.

Solid projection surfaces 8 and sphere surface 5 together form an uneven cleaning surface. This uneven cleaning surface is ideal for scrubbing the mouse rollers and contacts when rubbed against them.

The overall diameter of cleaning device 1 preferably is such that cleaning device 1 fits snugly within the mouse ball cavity with portions of projection surfaces 8 or spherical surface 5 in contact with the inner cavity surface, rollers, and contacts within the mouse. However, it should still be able to rotate within the cavity in a manner similar to the normal mouse ball.

To use the cleaning device, the mouse is turned upside down and the bottom cover is removed along with the normal mouse ball. In an embodiment in which cleaning device 1 has a well or a porous surface for the application of a cleaning solvent, such as isopropyl alcohol, then the appropriate solvent should be applied to those surfaces or inserted into the well. Cleaning device 1 is then inserted into the mouse ball cavity. The cover is then replaced on the mouse.

The computer mouse is then flipped over and used in a normal fashion. It is preferred that the mouse cleaning action be in a circular motion with the mouse and that the motion be vigorous. This motion will make cleaning device 1 rotate within the mouse cavity and against all rollers and contacts. As cleaning device 1 rotates within the mouse ball cavity, the uneven cleaning surface formed by projection surfaces 8 and spherical surface 5 will scrub the mouse rollers and contacts. This agitation and scrubbing will remove the accumulated grime from the rollers and contacts.

After the short, intense motions with the mouse, the mouse is flipped over and the cover removed. Cleaning device 1 is removed and the normal mouse ball is then put back into the cavity for normal use. After such use, the cleaning mouse may be cleaned in a dishwasher or by hand using soap and water.

What is claimed is:

1. A cleaning assembly for a computer mouse comprising:
   a sphere;
   a plurality of non-fibrous projections extending radially from the surface of the sphere and being of a length sufficient to touch the walls of the cavity of a computer mouse; wherein the external surfaces of projections and sphere surface form an uneven cleaning surface and further wherein the size of the cleaning assembly is sufficient to snugly fit within the cavity of a mouse.

2. The cleaning assembly of claim 1, the sphere further comprising a plurality of nested spheres.

3. The cleaning assembly of claim 2 wherein at least one of the nested spheres is porous.

4. The cleaning assembly or claim 1, the sphere further comprising a nested metal sphere enveloped with one or more non-metallic coatings or materials, wherein the outermost coating comprises the spherical surface.

5. The cleaning assembly of claim 1 wherein the spherical surface is comprised of a moisture repellent substance.

6. The cleaning assembly of claim 1 wherein the spherical surface is comprised of a moisture absorbent substance.

7. The cleaning assembly of claim 1 wherein the spherical surface and the projections are comprised of identical materials.

8. The cleaning assembly of claim 1 wherein the spherical surface and the projections are comprised of different materials.

9. The cleaning assembly of claim 1 wherein the spherical surface comprises rubber.

10. The cleaning assembly of claim 1 wherein the projections have a shape selected from the group consisting of: conical, rectangular, hemispheric, and pyramidical projections.

11. The cleaning assembly of claim 1 wherein the projection surfaces are comprised of a moisture resistant material.

12. The cleaning assembly of claim 1 wherein the spherical surface is porous.

13. The cleaning assembly of claim 1 wherein the projections are spaced evenly over the spherical surface.

14. The cleaning assembly of claim 1 wherein the projections are spaced irregularly over the spherical surface.

15. A cleaning assembly for a computer mouse comprising:
    a sphere containing at least one reservoir for storage of a cleaning solution or solvent; and
    a plurality of non-fibrous projections extending radially from the surface of the sphere and being of a length sufficient to touch the walls of the cavity of the computer mouse; wherein the external surfaces of projections and sphere surface form an uneven surface and further wherein the size of the cleaning assembly is sufficient to snugly fit within the cavity of the computer mouse.

16. The cleaning assembly of claim 15 wherein the reservoir is located within the surface of the sphere.

17. The cleaning assembly of claim 15 wherein the reservoir is contained within the sphere.

18. A method of cleaning a computer mouse which comprises:
    a) placing into the cavity of the mouse, wherein the mouse contains rollers, a cleaning assembly containing a sphere and a plurality of non-fibrous projections extending radially from the surface of the sphere;
    b) dragging the mouse containing the cleaning assembly over a surface and thereby for a time sufficient to clean the cavity of the mouse.

19. The method of claim 18, wherein the projections are spaced regularly over the spherical surface.

20. The method of claim 18, wherein the dragging of the mouse consists of principally circular motions.

* * * * *